United States Patent
Minakata et al.

(10) Patent No.: US 7,653,756 B2
(45) Date of Patent: Jan. 26, 2010

(54) RECORDING/REPRODUCING APPARATUS

(75) Inventors: Yoshimichi Minakata, Kanagawa (JP); Noriyuki Koga, Chiba (JP); Shinjiro Akiha, Saitama (JP); Kenichi Iida, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/474,349

(22) Filed: Jun. 26, 2006

(65) Prior Publication Data

US 2006/0253627 A1 Nov. 9, 2006

Related U.S. Application Data

(60) Continuation of application No. 11/294,420, filed on Dec. 6, 2005, now Pat. No. 7,478,175, which is a continuation of application No. 10/301,320, filed on Nov. 21, 2002, now Pat. No. 6,976,097, which is a division of application No. 09/445,961, filed as application No. PCT/JP99/02038 on Apr. 16, 1999, now Pat. No. 6,658,496.

(30) Foreign Application Priority Data

Apr. 17, 1998 (JP) ............................... P10-107942

(51) Int. Cl.
*G06F 3/00* (2006.01)
(52) U.S. Cl. .............................. 710/2; 710/8; 711/148; 704/201
(58) Field of Classification Search ............... 710/2, 710/8, 14; 711/148; 704/201
See application file for complete search history.

(56) References Cited

U.S. PATENT DOCUMENTS 5,270,877 A 12/1993 Fukushima et al.
5,768,619 A * 6/1998 Roberts ...................... 710/10

(Continued)

FOREIGN PATENT DOCUMENTS

JP 5-252509 9/1993

(Continued)

OTHER PUBLICATIONS

U.S. Appl. No. 12/259,367, filed Oct. 28, 2008, Minakata, et al.

*Primary Examiner*—Eron J Sorrell
(74) *Attorney, Agent, or Firm*—Oblon, Spivak, McClelland, Maier & Neustadt, L.L.P.

(57) ABSTRACT

A control method for controlling a recording/reproducing apparatus having plural storage units and an equipment to which the recording/reproducing apparatus is connected. The recording/reproducing apparatus has first and second storage units in which data and management data are stored. The equipment, to which is connected the recording/reproducing apparatus, has a third storage unit in which are stored the data and the management data. It is detected whether the equipment to be connected to the recording/reproducing apparatus has been connected to the recording/reproducing apparatus. If such connection is detected, the management data are read out from the first and second storage units. Based on the read-out management data and the management data stored in the third storage unit of the equipment, connected to the recording/reproducing apparatus, new management data, supervising the first to third storage units as one storage unit, is generated. The writing and readout for the plural storage units are controlled based on the generated new management data.

18 Claims, 8 Drawing Sheets

U.S. PATENT DOCUMENTS

| | | | |
|---|---|---|---|
| 5,819,069 A * | 10/1998 | Wong et al. ................ 379/67.1 |
| 5,839,108 A | 11/1998 | Daberko et al. |
| 5,878,282 A * | 3/1999 | Mital .......................... 710/62 |
| 5,935,221 A * | 8/1999 | Felmus et al. ................. 710/10 |
| 6,094,693 A | 7/2000 | Haneda |
| 6,130,985 A | 10/2000 | Fujita |
| 6,131,139 A * | 10/2000 | Kikuchi et al. .............. 711/103 |
| 6,185,665 B1 | 2/2001 | Owada et al. |
| 6,189,056 B1 * | 2/2001 | Ogura et al. ................. 710/62 |
| 6,453,281 B1 | 9/2002 | Walters et al. |
| 6,571,211 B1 | 5/2003 | Dwyer et al. |

FOREIGN PATENT DOCUMENTS

| | | |
|---|---|---|
| JP | 7-129200 | 5/1995 |
| JP | 9-97220 | 4/1997 |
| JP | 9-305464 | 11/1997 |
| JP | 09-325800 | 12/1997 |
| JP | 9-330100 | 12/1997 |

\* cited by examiner

FIG.1

| FILE NUMBER | TASK NUMBER | START ADDRESS | END ADDRESS | LP/SP | PRIORITY | ALARM/NON-ALARM | RECORDING DATE AND TIME | ALARM TIME |
|---|---|---|---|---|---|---|---|---|
| 01 | 01 | XXXX | OOOO | SP | 3 | 1 | XXX | OOO |
| 01 | 02 | □□□□ | △△△△ | LP | 1 | 0 | △△△ | --- |

FIG.2

| FILE NUMBER | TASK NUMBER | START ADDRESS | END ADDRESS | LP/SP | PRIORITY | ALARM/NON-ALARM | RECORDING DATE AND TIME | ALARM TIME |
|---|---|---|---|---|---|---|---|---|
| 01 | 01 | △△△△ | OOOO | LP | 0 | 0 | XXX | --- |
| 01 | 02 | XXXX | □□□□ | SP | 1 | 1 | △△△ | OOO |

| MEMORY NUMBER | FILE NUMBER | TASK NUMBER | START ADDRESS | END ADDRESS | LP/SP | PRIORITY | ALARM/ NON-ALARM | RECORDING DATE AND TIME | ALARM TIME |
|---|---|---|---|---|---|---|---|---|---|
| 00 | 01 | 01 | XXXX | ○○○○ | SP | 3 | 1 | XXX | ○○○ |
| 01 | 01 | 02 | XXXX | □□□□ | SP | 1 | 1 | △△△ | ○○○ |
| 00 | 01 | 02 | □□□□ | △△△△ | LP | 1 | 0 | △△△ | --- |
| 01 | 01 | 01 | △△△△ | ○○○○ | LP | 0 | 0 | XXX | --- |
|  |  |  |  |  |  |  |  |  |  |

RECORDING/REPRODUCING APPARATUS

CROSS-REFERENCE TO RELATED APPLICATIONS

This application is a continuation application of, and claims priority to, Ser. No. 11/294,420, filed Dec. 6, 2005, which is a continuation application of Ser. No. 10/301,320 filed Nov. 21, 2002, now U.S. Pat. No. 6,976,097, which is a division of application Ser. No. 09/445,961 filed Dec. 15, 1999, now U.S. Pat. No. 6,658,496, which is the National Stage of PCT/JP99/02038 filed Apr. 16, 1999, and claims priority to Japanese Patent Application P10/107,942 filed Apr. 17, 1998, the entire contents of which are hereby incorporated by reference.

TECHNICAL FIELD

This invention relates to a recording/reproducing apparatus and a method for controlling an equipment to which is connected the recording/reproducing apparatus. More particularly, it relates to a recording/reproducing apparatus having plural memory units and a method for controlling an equipment to which is connected the recording/reproducing apparatus.

BACKGROUND ART

There has hitherto been provided a recording/reproducing apparatus having a flash memory for storage of speech signals on the file basis. This recording/reproducing apparatus is designed not only to store the input speech to a microphone as speech data in the flash memory but also to store data used for e.g., computer data processing. That is, the recording/reproducing apparatus not only has the speech information recording/reproducing function but also is able top record and store desired data as a recording medium.

Meanwhile, a user desirous to transfer data stored in a flash memory of a recording/reproducing apparatus has to transfer data read out from the flash memory to an external equipment, such as a data computer, using communication means, for processing, or to transfer the read-out data via an external output unit designed to output the speech. However, this data transfer to the external equipment is a cumbersome operation.

For facilitating data transfer, it may be contemplated to provide a main body unit of the recording/reproducing apparatus with a detachable flash memory and to connect the flash memory detached from the main body unit to a computer as an external equipment.

The recording/reproducing apparatus, from which has been detached the flash memory, and which thus has no flash memory as data storage means, no longer has the function as a data recording/reproducing apparatus. It is not necessarily reasonable to store required data in a removable flash memory provided on the main body unit of the apparatus.

DISCLOSURE OF THE INVENTION

In view of the above-described status of the art, it is an object of the present invention to provide a recording/reproducing apparatus in which it is possible to improve tractability of a recording/reproducing apparatus having plural storage units, such as removable storage units, and to facilitate the operation of transfer processing for data stored in a storage unit of the recording/reproducing apparatus. It is another object of the present invention to provide a method for controlling the equipment to which is connected the recording/reproducing apparatus.

For accomplishing the above object, the recording/reproducing apparatus according to the present invention includes plural storage units for storing data and management data for supervising the data, and control means for reading out the respective management data from the respective storage means to generate new management data and handling the respective storage units as one based on the new management data to control data writing and data readout.

The recording/reproducing apparatus writes or reads out data for the respective storage units, based on the management data of the respective storage units, to enable the data to be handled easily by a user not conscious of the distinction between the respective storage units.

Other objects and particular advantages of the present invention will become more apparent from the explanation of following embodiments of the invention.

BEST MODE FOR EXECUTING THE INVENTION

A recording/reproducing apparatus according to the present invention is now explained in detail with reference to the drawings.

First, explanation will be made of a first embodiment of the recording/reproducing apparatus of the present invention.

The recording/reproducing apparatus according to the present invention (termed simply an IC recorder) includes a flash memory 9, which is an electrically erasable/programmable read-only memory (EEPROM) allowing for electrical data erasure/rewriting by a recording unit 10, a controller 30 for performing control to write speech data in the flash memory 9 and to reproduce speech data read out from the flash memory 9 by a reproducing unit 20, and a display unit 40 for displaying the actuation contents from an actuating unit 50 and the speech data contents stored in the flash memory 9.

The flash memory 9, used herein, includes a first flash memory 9a non-detachably enclosed in the IC recorder 1 and a second flash memory 9b detachable from the IC recorder 1.

The recording unit 10 includes a microphone for converting the speech into electrical signals outputting the converted speech signals, and an amplifier 12 for amplifying output speech signals of the microphone 11. The recording unit 10 also includes an automatic gain control circuit 13, referred to below as automatic gain controller or AGC, and an encoder 14 for converting output speech signals of the AGC 13 into speech data. The recording unit 10 likewise includes a buffer memory 15 for transiently storing speech data from the encoder 14.

The microphone 11 collects the sound and transduces the collected sound into speech signals, which then are routed to the amplifier 12. The amplifier 12 amplifies the speech signals from the microphone 11 to route the amplified speech signals to the AGC 13. The AGC 13 controls the gain so that the gain of the speech signals amplified by the amplifier 12 will be at a pre-set value, and routes the gain-controlled speech signals to the encoder 14.

The encoder 14 exploits the strong temporal correlation of the speech signals and encodes the speech signals by, for example, adaptive differential pulse code modulation (AD-PCM) to generate speech data which then is routed via buffer memory 15 and controller 30 to the flash memory 9. The encoder 14 is able to adjust the encoding volume of the speech data responsive to two modes, such that it effectuates sampling at 8 kHz and 4 kHz if the mode is the standard play (SP) mode or the long play (LP) mode, respectively, to adjust the encoding volume of the speech signals with respect to the time axis direction. The SP or LP mode can be optionally selected by the user acting on the actuating unit 50.

The recording unit 10 is in operation since a recording start button, not shown, of the actuating unit 50, is thrust, until a stop button, not shown, is thrust. During this time, speech data corresponding to the output speech signals of the microphone 11 is recorded as a task file in the flash memory 9. If, for example, the second flash memory 9b is not loaded on the IC recorder 1, the speech data is stored in the first flash memory 9a. If the second flash memory 9b is loaded on the IC recorder 1 and the first flash memory 9a is charged to its full capacity, the speech data is written in the second flash memory 9b.

The first flash memory 9a is enclosed in the IC recorder 1, while the second flash memory 9b can be attached to the IC recorder 1 and is connected to the controller 30 via connector 8. It can be optionally determined whether speech data is to be written with priority in the first flash memory 9a or in the second flash memory 9b. Alternatively, a changeover button may be provided in the actuating unit 50 to permit the user to select in which of the first or second flash memories 9a or 9b the speech data is to be stored.

Figure 2:
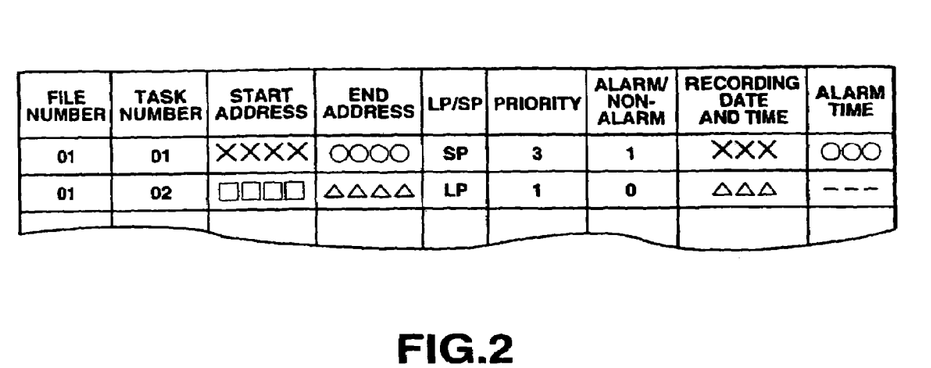
FIG. 2 is a diagram showing an enclosed type flash memory provided in the IC recorder.

The first flash memory 9a has, along with a task file storage area in which to store speech data, that is task files, a TOC data storage area in which to store the TOC (table-of-contents) data used to supervise the respective task files. Referring to FIG. 2, the TOC data stored in the TOC data storage area is constituted by "file number", "task number", "start address", "end address", "LP/SP", "priority", "alarm/non-alarm", "priority", "recording date and time", and "alarm time", on the file basis.

The "file number" is a number used to roughly group the respective task files, and plays the part of a so-called directory or a folder. The "file number" is, for example, "00", "01", and "10", associated with files A, B and C, respectively. The user is able to record a task file on a work in the file A or to record a task file on personal taste in the file B, for example, by way of supervising the task files.

The "task number" indicates the number of the actually recorded task file and specifically the order of the task files recorded in one of the files A to C. By these "task numbers", the task file is identified as being, for example, "task file of a task number of the file C" or "task file of a task number 1 of the file C", depending on the "file number" and the "task number".

The "start address" specifies a physical start address of the recorded task file, while the "end address" specifies the physical end address of the task file.

The "LP/SP" means the recording mode of the aforementioned task file. The LP mode and the SP mode differ from each other as to the sampling frequency for recording, as mentioned previously.

The "priority" specifies the degree of priority of the task file. The larger the number, the higher becomes the degree of priority. The number for "priority" is from 0 to 3, with the priority 3 denoting the highest priority.

The "alarm/non-alarm" specifies that an alarm reproducing function is set on the task file. The alarm reproducing function means the function of reproducing the recorded task file at a pre-set time point.

The "recording date and time" means the actual task file recording time and date.

The "alarm time" means the time point of reproducing the task file for which the alarm has been set.

For example, in the first flash memory 9a in FIG. 2, the task file of the file number A with the task number 01 has been recorded with the SP mode, with the priority being 3. The task file with the file number A with the task number 02 has been recorded with the LP mode, with the priority being 1.

Figure 3:
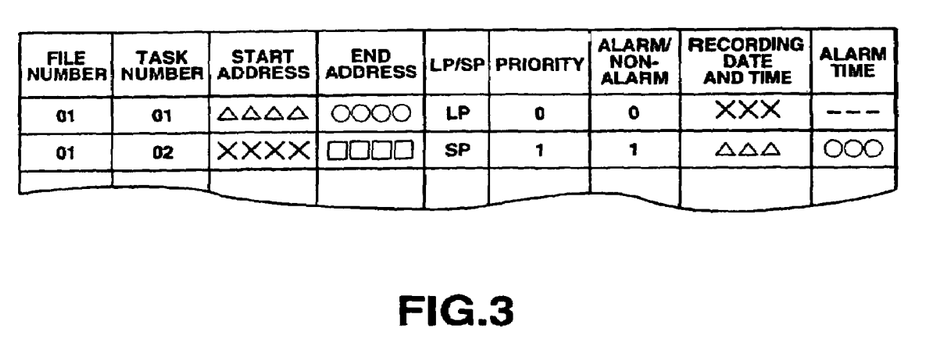
FIG. 3 is a diagram showing a detachable flash memory provided in the IC recorder.

The second flash memory 9b is configured similarly to the first flash memory 9a, and has, in addition to the task file storage area for storming a task file, a TOC data storage area for storing TOC data designed to supervise the task files. The TOC data, stored in the TOC data storage area, is configured similarly to the TOC data of the first flash memory 9a, as shown in FIG. 3. For example, the task file of the file number A and the task number 01 in the second flash memory 9b in FIG. 3 is recorded in the LP mode and has the priority equal to 0, while the task file of the file number A and the task number 02 is recorded in the SP mode and has the priority equal to 1.

The reproducing unit 20 has a decoder 21 for transducing speech data read out from the flash memory 9 under control by the controller 30, a filter 22 for removing high-range components, and an amplifier 23 for amplifying speech signals from the filter 22 to send the amplified signal to a speaker 24.

The decoder 21 is a counterpart device of the encoder 14 of the recording unit 10, and decodes speech data, which is speech data encoded by the ADPCM system read out from the flash memory 9 responsive to the sampling points mp11, mp12, . . . mplk or LP mode, to generate so-called PAM signals. The filter 22 eliminates high-frequency components higher than the audible range from the PAM signals to output speech signals. The amplifier 23 amplifies the speech signals supplied from the decoder 21 to route the amplified signals to the speaker 24. The speaker 24 is fed with and driven by the speech signals to reproduce speech data recorded in the flash memory 9.

The controller 30 includes a ROM 31, having stored therein a program for controlling the operation of the IC recorder 1, and a micro-computer, referred to below as a CPU 32, executing the program stored in the ROM 31, for controlling the flash memory 9, recording unit 10, reproducing unit 20 and the display unit 40. The controller 30 also includes a timer 33 for generating the timing information, a random access memory, referred to below as RAM 34, for temporarily storing the time and the results of program execution etc, and an input/output (I/O) port 35 for connection to outside, and controls the various circuits based on operational setting by the actuating unit 50.

The RAM 34 stores, on startup, the TOC (table-of-contents) information, read out from the flash memory 9, or timing data for reproducing the speech file. The CPU 32 compares the reproducing time stored in the RAM 34 to the timing information of the timer 33 and reproduces the speech file on coincidence between the two data.

The display unit 40 includes a liquid crystal display element 41 of low power consumption and a backlight 42 for illuminating the liquid crystal display element 41 and displays the operating state or the actuating sequence of the IC recorder 1 on the liquid crystal display element 41.

With the above-described IC recorder 1, data can be co-owned without distinction between the first flash memory 9a and the second flash memory 9b. Since the TOC data are recorded in the first and second flash memories 9a, 9b, these TOC data need to be supervised collectively. Thus, if the power source is turned on to start the IC recorder 1, or before start of the recording/reproducing operation, the CPU 32 performs the processing shown in step ST1 and in the following steps shown in FIG. 4.

Figure 4:
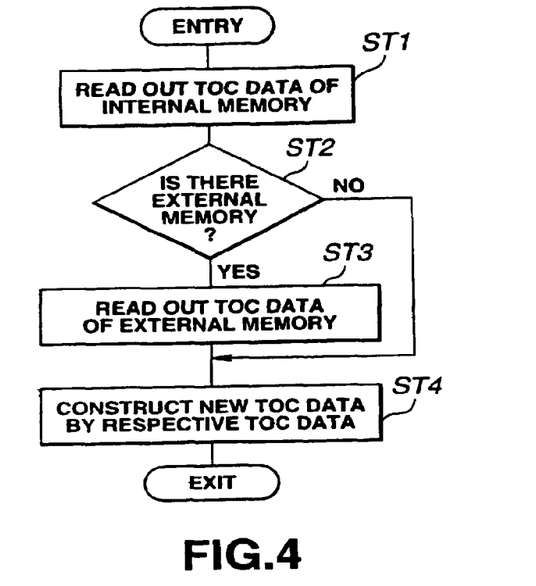
FIG. 4 is a flowchart for illustrating the CPU operation at the time of starting of an IC recorder.

At step ST1, the CPU 32 reads out TOC data in the first flash memory 9a to store the read-out data in the RAM 34. The CPU 32 then proceeds to step ST2.

At step ST2, the CPU 32 verifies whether or not connection is made to the second flash memory 9b via connector 8, that is whether or not there is the second flash memory 9b. If the result of decision is YES, that is if connection is made to the second flash memory 9b, the CPU 32 proceeds to step ST3 and, if otherwise, the CPU 32 proceeds to step ST4. The detection at step ST2 as to whether or not there is the connection to the second flash memory 9b may also be made mechanically by providing the connector 8 with a switch actuated on insertion and connection of the second flash memory 9b, or by the CPU 32 discriminating whether or not data exchange is possible with the second flash memory 9b via connector 8. It is also possible to use other methods to detect by the CPU 32 whether or not there is the connection to the second flash memory 9b.

At step ST3, the CPU 32 reads out TOC data of the second flash memory 9b to store the read-out data in the RAM 34. The CPU 32 then proceeds to step ST4.

At step ST4, the CPU 32 appends to the read-out TOC data of the first and second flash memories 9a, 9b memory numbers indicating to which of the two flash memories belong the TOC data, and generates new TOC data on the RAM 34. Meanwhile, if there lacks the connection of the second flash memory 9b, the TOC data of the first flash memory 9a is directly stored in the RAM 34.

Figure 5:
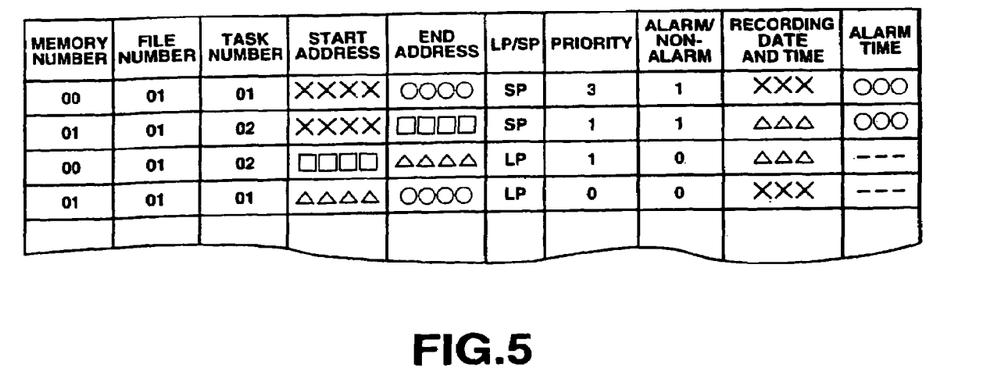
FIG. 5 is a diagram showing TOC data for monistically managing task files recorded on the enclosed or detachable flash memory.

After the end of the processing of the steps ST1 to ST4, the TOC data configured as shown in FIG. 5 is constituted on the RAM 34. Meanwhile, the TOC data is constructed by the respective TOC data of the first and second flash memories 9a, 9b.

The TOC data, shown in FIG. 5, is configured substantially similarly to the respective TOC data of the flash memories 9a, 9b, and is made up of "memory number", "file number", "task number", "start address", "end address", "LP/SP", "priority", "alarm/non-alarm", "priority", "recording date and time", and "alarm time", on the task file basis. The memory number of "00" or "01" specifies that the task file is that of the first flash memory 9a or that of the second flash memory 9b, respectively. Thus, the respective task files are specified by the "memory number", "file number" and the "task number". If a pre-set operation is performed by the actuating unit 50, the CPU 32 sorts the task files in the order of dates, alarm or priority, based on the TOC data shown in FIG. 5, to display the contents concerning the task file selected by the user by the actuating unit 50 on the liquid crystal display element 41 of the display unit 41.

The IC recorder 1 newly generates TOC data of the respective task files stored in the first and second flash memories 9a, 9b, by the CPU 32, from the respective TOC data of the first and second flash memories 9a, 9b, and displays the contents of the respective task files on the display unit 40, based on the generated TOC data. Thus, the contents of the respective task files can be outputted from the speaker 24 to the user or presented on the display unit 40 without the user becoming conscious in which of the first and second flash memories 9a, 9b the task file desired by the user is stored.

The operation of the CPU 32 when moving the task file is explained. It is assumed that the respective TOC data of the first and second flash memories 9a, 9b have been read out from the flash memories 9a, 9b and already stored in the RAM 34.

Figure 6:
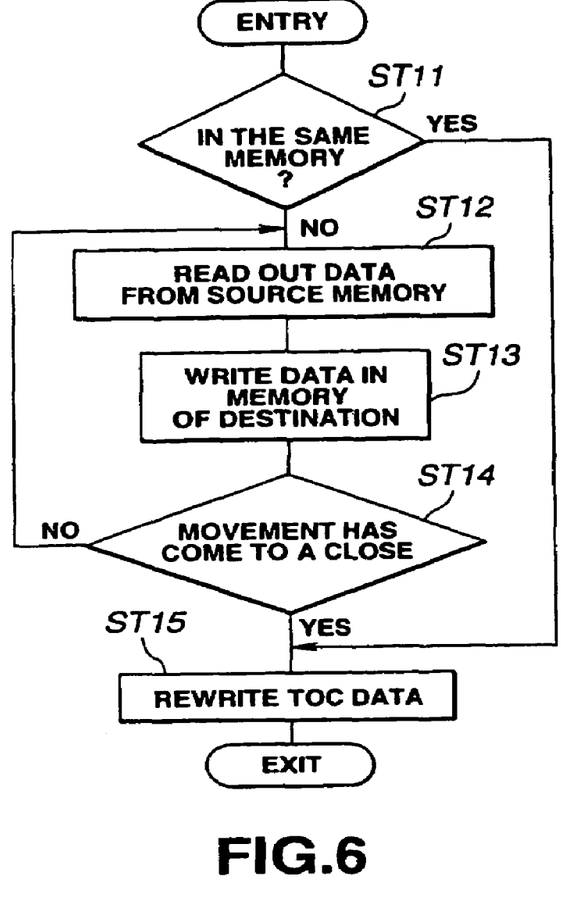
FIG. 6 is a flowchart for illustrating the operation of the CPU when moving the task files.

If the user acts on the actuating unit 50 to command movement of a specified task file, the CPU 32 performs the processing as from step ST11 shown in FIG. 6.

At step ST11, the CPU 32 checks whether or not the task file to be moved is that in the same flash memory. Specifically, the CPU 32 checks whether the task file of the first flash memory 9a or the second flash memory 9b is to be moved in the first flash memory 9a or in the second flash memory 9b. If it is found that the task file is to be moved in the same flash memory, the CPU 32 proceeds to step ST15 and, if otherwise, the CPU 32 proceeds to step ST12. The task file movement in the same flash memory may be exemplified by storage of a task file stored as a file A as a task file of the file C.

At step ST12, the CPU 32 reads out the task file to be moved from a source flash memory, such as first flash memory 9a, to store the read-out task file in the RAM 34. The CPU 32 then moves to step ST13.

At step ST13, the CPU 32 reads out the task file stored in the RAM 34 to start the processing of writing the file in the flash memory of destination, such as the second flash memory 9b. The CPU 32 then proceeds to step ST14.

At step ST14, the CPU 32 checks whether movement of a task file to the flash memory of destination, such as the second flash memory 9b, has come to a close, that is whether or not data constituting the task file has been written in its entirety in the flash memory of destination. If the movement of a task file to the flash memory of destination has not come to a close, the CPU 32 reverts to step ST12. This repeats the processing from step ST12 to step ST14 to write the task file being moved in the destination flash memory. If the movement of a task file to the flash memory of destination has come to a close, the CPU 32 deletes the task file moved from the source flash memory to proceed to step ST15.

At step ST15, the CPU 32 rewrites the TOC data in the source flash memory and in the flash memory of destination, stored in the RAM 34, to write new TOC data in the first and second flash memories 9a, 9b to terminate the processing. If it is found at step ST11 that movement of the task file being moved is that in the same flash memory, the CPU 32 rewrites only TOC data of the pertinent one of the first and second flash memories 9a, 9b.

Figure 7:
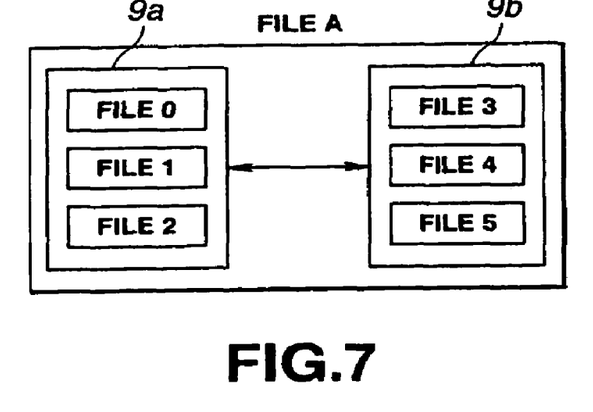
FIG. 7 illustrates the state of the task files recorded in each flash memory.

The IC recorder 1 collectively supervises and handles the files 0 to 5 of the flash memories 9a, 9b, across the first and second flash memories 9a, 9b, as a group of a file A, without making distinction as to whether the task files stored in the first and second flash memories 9a, 9b are stored in the flash memory 9a or in the flash memory 9b, as shown for example in FIG. 7.

Therefore, the source of the task file being moved may be the first flash memory 9a or second flash memory 9b. Thus, the user is able to execute the movement of the task files as the or she remains unconscious of whether the flash memory to which the task file is to be moved is the first flash memory 9a or the second flash memory 9b, or whether the flash memory to which the task file is to be moved is the detachable second flash memory 9b or the first flash memory 9a in the IC recorder 1.

Although movement of the task file is taken as an example in the preferred embodiment, recording, reproduction, erasure, retrieval or copying of the task file can similarly be made without distinction between the first and second flash memories 9a, 9b. Thus, the user is able to handle task files without the necessity of being conscious as to in which of the flash memories the ask file is stored.

By storing the necessary task files in the second flash memory 9b, dismounting this second flash memory 9b from the IC recorder 1 and connecting it to another device, such as a personal computer, task files can be transferred easily from the IC recorder 1 to the other device.

For example, if such a telephone handset is available by which task files can be stored in the second flash memory 9b or by which task files recorded in the second flash memory 9b or other flash memories, the contents of the telephone call can be stored in the second flash memory 9b, and the second flash memory 9b can be detached from the second flash memory 9b and loaded on the IC recorder 1 to hear the contents of the telephone talk stored in the second flash memory 9b. Conversely, the second flash memory 9b can be detached from the IC recorder 1 and loaded on the aforementioned telephone handset to reproduce the task files recorded in the second flash memory 9b for hearing by the counterpart of telephone talks.

Since the image data generating device has the so-called enclosed type first flash memory 9a, that is not detachable from the IC recorder 1, speech data can be recorded using the first flash memory 9a, even if the second flash memory 9b has been detached from the IC recorder 1, while the task file can be reproduced on the basis of the TOC data of the first flash memory 9a.

Figure 1:
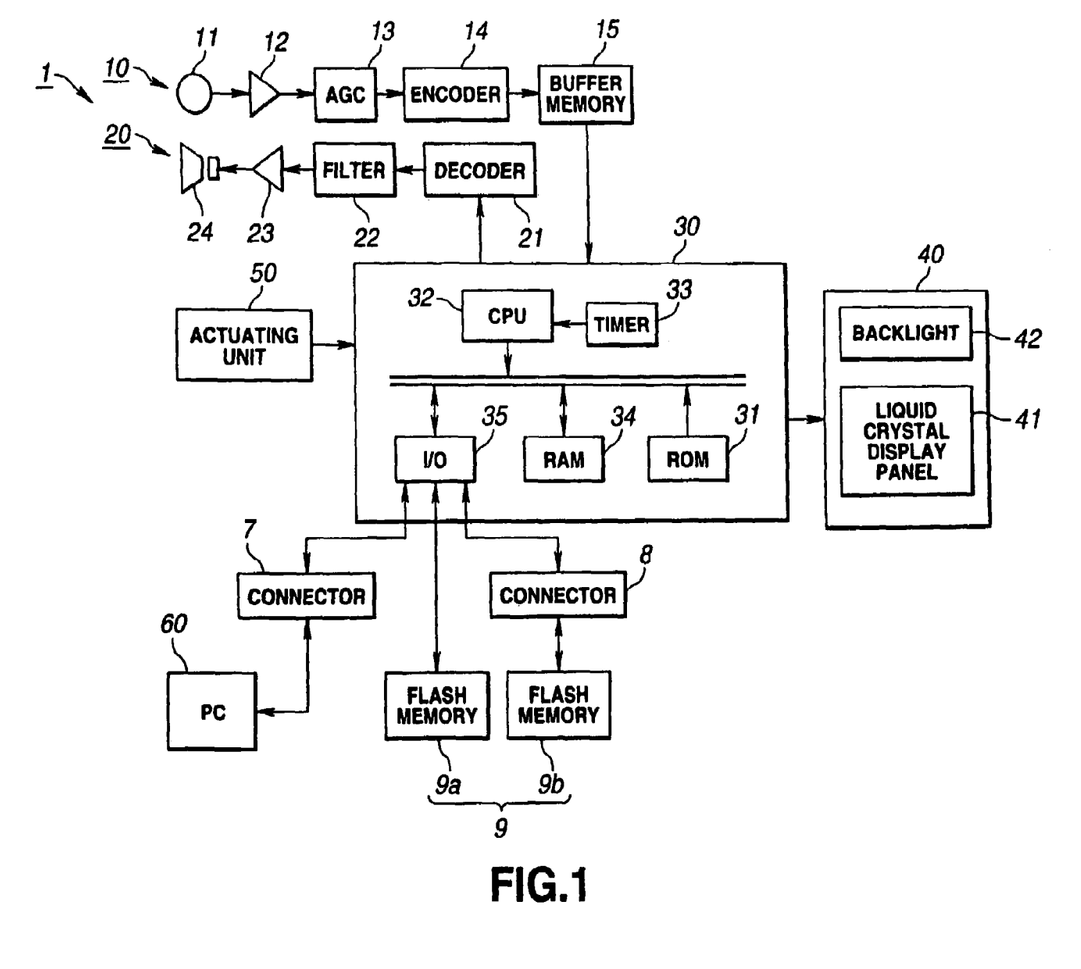
FIG. 1 is a block diagram showing an IC recorder embodying the present invention.

A second embodiment of the present invention is now explained. In the present second embodiment, it is assumed that the IC recorder 1 and a personal computer 60 as an external equipment are interconnected by a connector 7, as shown in FIG. 1. It is assumed that the personal computer 60 has a storage unit for storage of plural task files and TOC data for supervising the task files.

Figure 8:
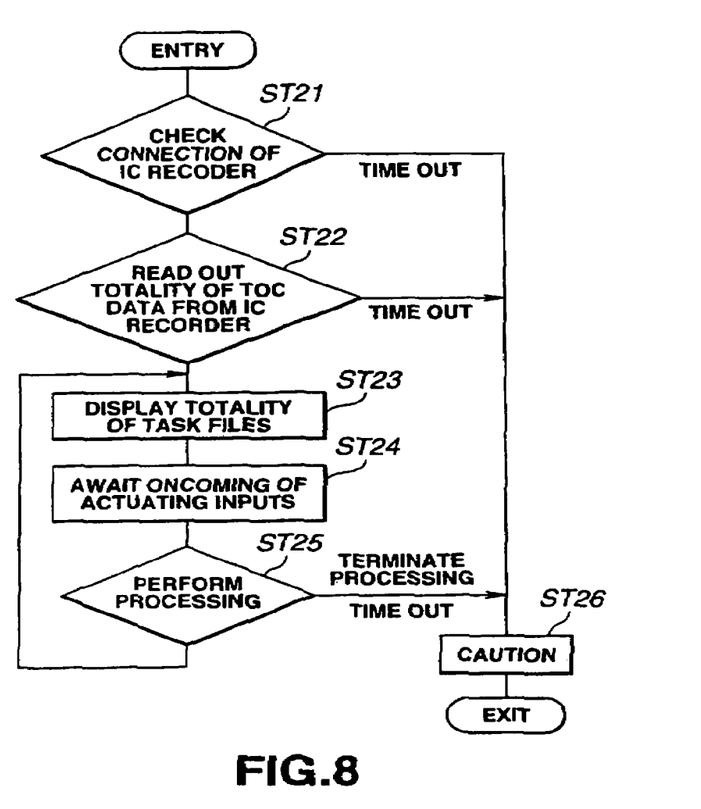
FIG. 8 is a flowchart showing control contents of a personal computer on startup of the application, with the IC recorder being connected to the personal computer.

If the IC recorder 1 is connected to the personal computer 60 via connector 7 and a connection cable, the actuating unit 50 of the IC recorder 1 ceases its operation to evade complexity of the operation. An input signal from the actuating portion of the personal computer 60 is sent to the controller 30 such that the IC recorder 1 is controlled by the personal computer 60. On startup of the application, the personal computer 60 performs the processing as from step ST21 to step ST26 as shown in FIG. 8.

At step ST21, the personal computer 60 exchanges signals or data with the IC recorder 1 via connector 7 to check the connection. It the personal computer 60 verifies that it is connected to the IC recorder 1, it proceeds to step ST22. If the personal computer 60 cannot detect that it is connected to the IC recorder 1, such that transmission data is not sent from the IC recorder 1 to the personal computer 60 within a pre-set time, that is, so-called time-out is judged to have occurred, the personal computer 60 proceeds to step ST26.

At step ST22, the personal computer 60 performs the processing of reading out the totality of TOC data from the first and second flash memories 9a, 9b of the IC recorder 1. If the totality of the TOC data has been read out from the respective first and second flash memories 9a, 9b, the personal computer 60 proceeds to the second step 23. If, for example, there is no task file stored in the first or second flash memories 9a, 9b, such that pre-set time has elapsed without TOC data being read out to produce time-out, the personal computer 60 proceeds to step ST26.

Figure 9:
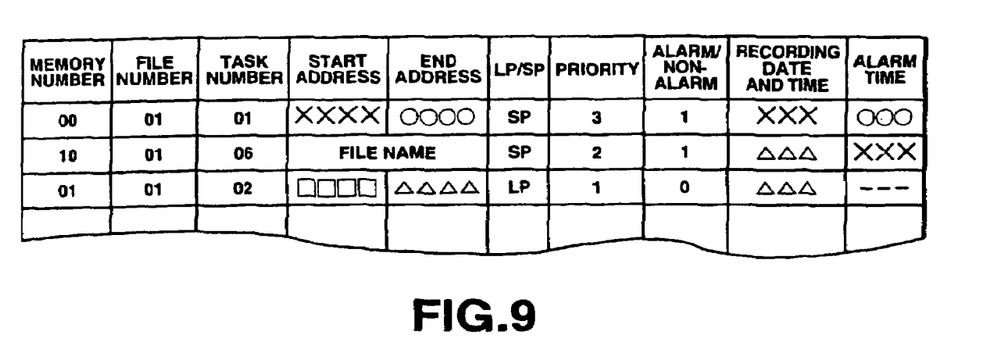
FIG. 9 is a diagram showing TOC data for monistically managing the task files recorded on the enclosed or detachable flash memory or personal computer.

At step ST23, the personal computer 60 displays the information on the totality of task files, such as TOC data shown in FIG. 9 on a display device, not shown, based on the TOC data read out from the first and second flash memories 9a, 9b. The personal computer 60 then proceeds to step ST24.

At step ST24, the personal computer 60 awaits the oncoming of actuating inputs from actuating portions, such as keyboards or mouse, not shown, to proceed to step ST25.

At step ST25, the personal computer 60 performs the processing conforming to the actuating input from the actuating unit. The personal computer 60 then reverts to step ST23. If the processing at step ST23 comes to a close or in case of time-out, the personal computer 60 proceeds to step ST26.

At step ST26, the personal computer 60 indicates on the display unit that the processing up to step ST25 has come to a close, or that time-out has occurred. The personal computer 60 then terminates the processing.

The personal computer 60 thus reads out and supervises the TOC data of the first and second flash memories 9a, 9b from the IC recorder 1 to control the operation of the IC recorder 1.

The personal computer 60 generates new TOC data, as shown for example in FIG. 9, based on TOC data read out from the first and Second flash memories 9a, 9b, and TOC data for the personal computer supervising the task files within the personal computer 60. The new TOC data, thus generated, is stored in a storage area dedicated to the storage unit designed to store the TOC data for the personal computer 60.

The TOC data, shown in FIG. 9, is configured substantially similarly to the TOC data shown in FIG. 9, and is made up of "memory number", "file number", "task number", "start address", "end address", "LP/SP", "priority", "alarm/non-alarm", "recording date and time", and "alarm time".

The "memory number" of "00", "01" or "10" denotes the task file of the first flash memory 9a, task file of the second flash memory 9b and the task file stored in the personal computer 60, respectively. In the "start address" and "end address" of the task files of the TOC data, stored in the personal computer 60, there are indicated the filenames of the task files, as shown in FIG. 9.

For example, in FIG. 9, the task file of the file number 01, with the task number 01, stored in the first flash memory 9a, is of SP mode and the priority 3. The task file of the file number 01, with the task number 02, stored in the personal computer 60, has the pre-set filename, with the mode being the SP mode and the priority equal to 2.

Using the TOC data, shown in FIG. 9, the personal computer 60 displays the information of the respective task files on a display device, not shown, in the order of the falling priority, in the order of the alarm setting time becoming remoter from the current time or in the order of the earlier recording time. Thus, the user is able to handle task files without becoming conscious as to in which of the IC recorder 1 or the personal computer 60 the task file being handled is recorded, so that the user interface can be improved in tractability.

The configuration of the communication data when the communication is had between the IC recorder 1 and the personal computer 60 is hereinafter explained.

Figure 10:
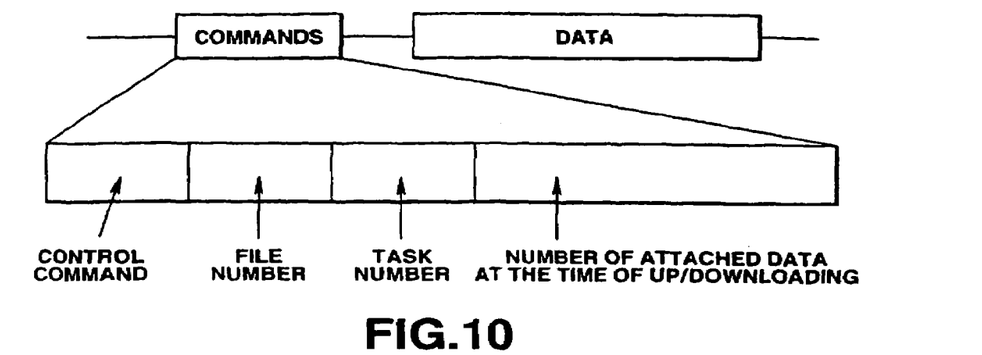
FIG. 10 shows the structure of communication data between the IC recorder and the personal computer.

The communication data is made up of "commands" and "data", as shown in FIG. 10. The "commands" may be enumerated by a "control command", "file number", "task number" and the "number of attached data". The "control command" shows the contents of control commands, such as upload/download. The "number of attached data" indicates the number of attached data at the time of downloading. The communication data is occasionally devoid of a data portion, depending on the contents of the control command.

Figure 11:
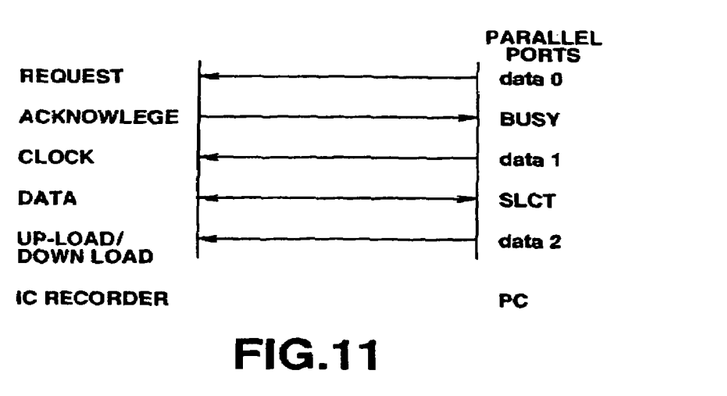
FIG. 11 illustrates parallel ports of the IC recorder and the personal computer.

The exchange of communication data between the IC recorder 1 and the personal computer 60 is explained. It is assumed here that the IC recorder 1 and the personal computer 60 are provided with parallel ports to have parallel communication with each other. As the parallel ports of the personal computer 60 of the IC recorder 1 and the personal computer 60, there are provided parallel ports "data 0", "data 1", "data 2", "busy" and "select", as shown in FIG. 11.

Figure 12:
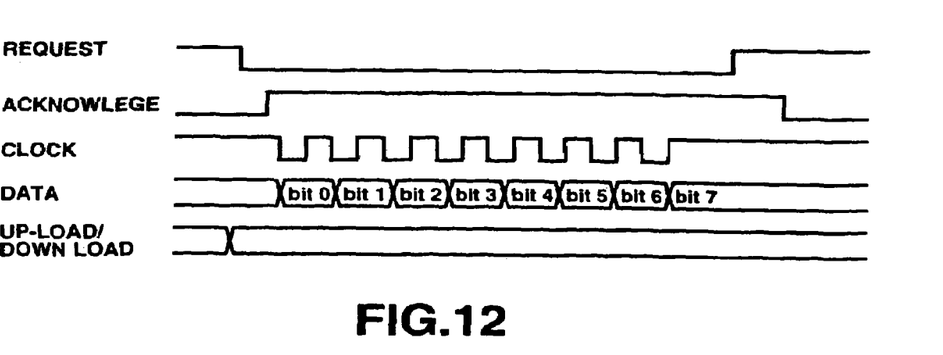
FIG. 12 is a timing chart for data transmission/reception between the IC recorder and the personal computer.

First, the personal computer 60 sends a request signal inquiring the IC recorder 1 whether or not data can be exchanged and, directly after sending the request signal, sends a control command instructing uploading or downloading to the IC recorder 1, as shown in FIG. 12. If ready for transmission/reception, the IC recorder 1 returns an acknowledgement signal of that effect to the personal computer 60. On confirming reception of the acknowledgement signal, the personal computer 60 sends pre-set clocks to the IC recorder 1 and transmits/receives data for uploading or downloading in synchronism with the clocks.

In a state in which the IC recorder 1 and the personal computer 60 can have data transmission/reception with each other, task files can be moved easily between the IC recorder 1 and the personal computer 60. Specifically, the personal computer 60 performs the processing as from step ST31 shown in FIG. 13.

Figure 13:
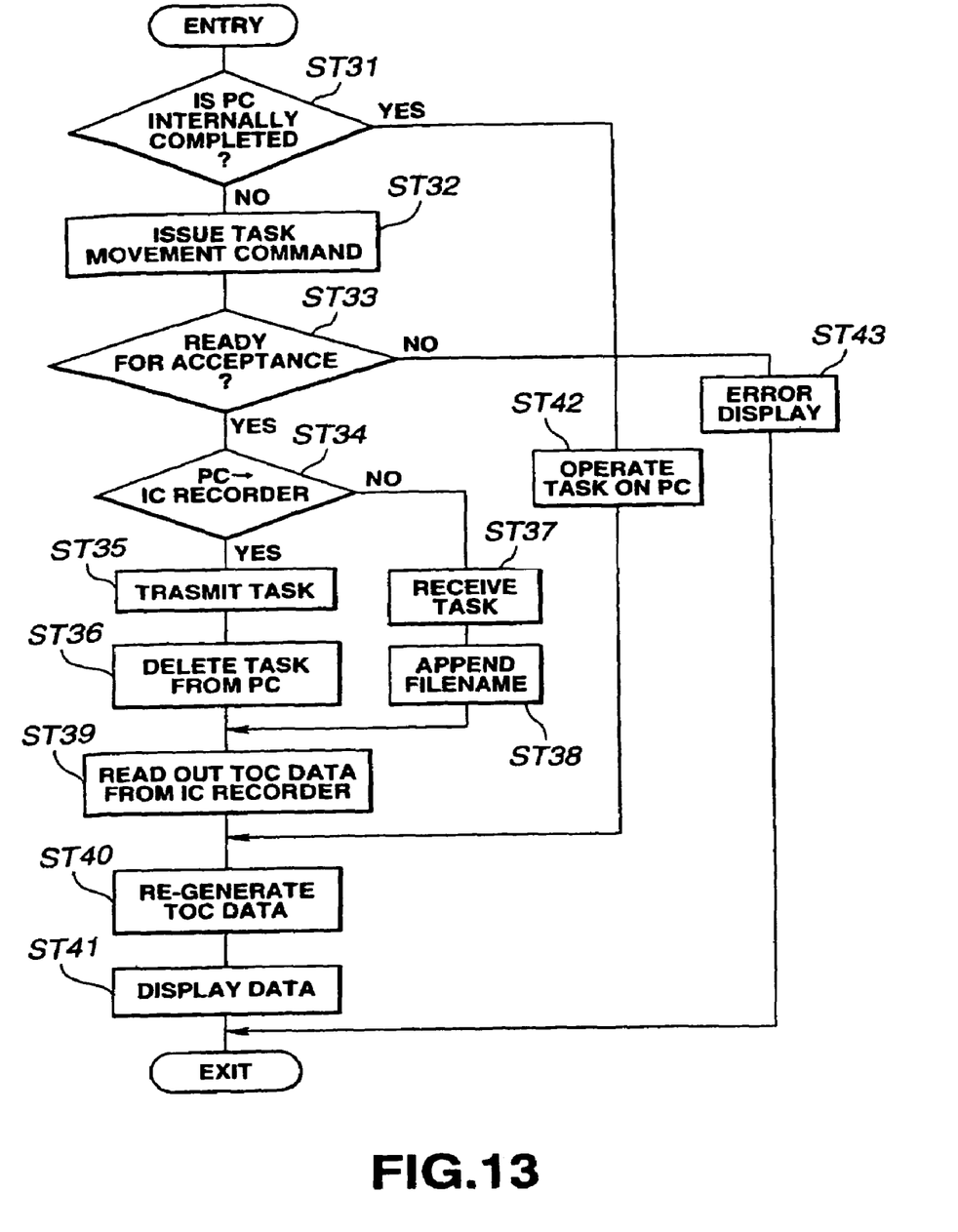
FIG. 13 is a flowchart for illustrating control contents of a personal computer when a task file is to be moved when the IC recorder is connected to the personal computer.

At step ST31, the personal computer 60 checks whether or not the task movement is internally completed, that is whether or not the task file is not moved between it and the IC recorder 1. If the personal computer 60 has verified that the task file is not moved between it and the IC recorder 1, the personal computer 60 proceeds to step ST42 and, if otherwise, it proceeds to step ST32.

At step ST32, the personal computer 60 sends a request signal to the IC recorder 1. Directly after sending the request signal, the personal computer 60 sends a request signal to the IC recorder 1. Directly after transmission of the request signal, a "command" having a "task movement command" is sent as the "control command" shown in FIG. 10 to the IC recorder 1. The personal computer 60 then proceeds to step ST33.

At step ST33, the personal computer 60 verifies whether or the IC recorder 1 has received a task issuing command and is ready for acceptance. Specifically, the personal computer 60 verifies whether or not it has received the acknowledge signal from the IC recorder 1 and, if it has received the acknowledge signal, the personal computer 60 deems that the IC recorder 1 is ready for acceptance and proceeds to step ST34. If the acknowledge signal is not received within pre-set time, the personal computer 60 deems that the IC recorder 1 is not ready for acceptance, and proceeds to step ST43.

At step ST34, the personal computer 60 verifies whether or not the task being moved is moved from the personal computer 60 to the IC recorder 1. If the task is moved from the personal computer 60 to the IC recorder 1, the personal computer 60 proceeds to step ST35. If the task is not moved from the personal computer 60 to the IC recorder 1, the personal computer 60 deems that the task file is moved from the IC recorder 1 to the personal computer 60 and proceeds to step ST37.

At step ST35, the personal computer 60 transmits the task file to be moved to the IC recorder 1 and then proceeds to step ST36. In association with the processing at step ST35, the personal computer 60 performs control to update TOC data of the flash memory 9.

At step ST36, the personal computer 60 deletes the transmitted task file from the storage unit of the personal computer 60 and proceeds to step ST39. The personal computer 60 also updates the TOC data supervising the task file stored in the storage unit of the personal computer 60.

At step ST37, to which the personal computer 60 moves when it verifies at step ST34 that the task file being moved is not moved from the personal computer 60 to the IC recorder 1, the personal computer 60 receives the task file from the IC recorder 1 and proceeds to step ST38. In association with the processing at step ST37, the personal computer 60 performs control to update the TOC data of the flash memory 9.

At step ST38, the personal computer 60 appends the filename to the received task file for storage in the storage unit of the personal computer 60. The personal computer 60 then proceeds to step ST39. At this time, the personal computer 60 deletes the received task file from the flash memory 9 of the IC recorder 1 and updates the TOC data of the flash memory 9, as mentioned previously.

At step ST39, the personal computer 60 reads out the TOC data from the flash memory 9 of the IC recorder 1 and then proceeds to step ST40.

At step ST40, the personal computer 60 re-generates the TOC data, which supervises the totality of the task files, based on the read-out TOC data and the TOC data in the personal computer 60. The personal computer 60 then proceeds to step ST41.

At step ST41, the personal computer 60 performs control to display data concerning task files stored in the IC recorder 1 and in the personal computer 60, based on the re-generated TOC data, to terminate the processing.

At step ST42, to which the personal computer 60 moves when it has been verified at step ST31 that the task movement is internally completed, the personal computer 60 moves the task file in accordance with the operational setting on the personal computer 60, before proceeding to step ST40.

At step ST43, to which the personal computer 60 proceeds when it has verified at step ST33 that the IC recorder 1 has not been readied for acceptance within the preset time, the personal computer 60 displays the error on the display device, not shown, to terminate the processing.

Figure 14:
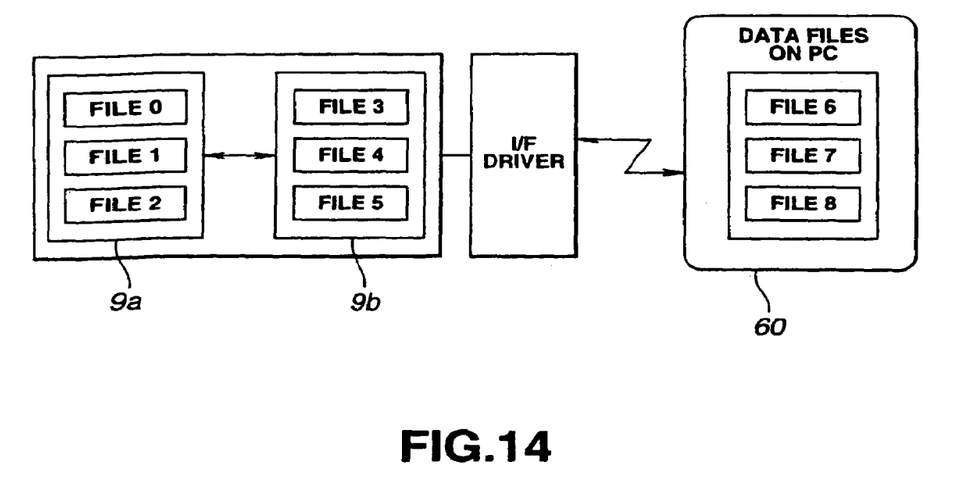
FIG. 14 illustrates the state of task files recorded on each flash memory and each personal computer.

Thus, with the personal computer 60, the task files, stored in the first flash memory 9a enclosed in the IC recorder 1, in the second flash memory 9b detachably mounted on the IC recorder 1 or in the storage unit of the personal computer 60, that is task files 0 to 8, can be moved freely between the personal computer 60 and the IC recorder 1, without the user having to be conscious from which memory or storage unit the task file is derived, as shown in FIG. 14. That is, even in data transmission/reception with the external equipment or with the external devices, the task files can be supervised without making distinction as to the type of the recording medium, subject to coincidence of the transmission/reception format.

Even if the second flash memory 9b, mounted on the IC recorder 1, is detached from the IC recorder 1, the personal computer 60 is able to generate new TOC data, based on the TOC data stored in the first flash memory 9a and in the storage unit of the personal computer 60, that is on the TOC data except the TOC data stored in the second flash memory 9b, to read or write the task files based on the generated TOC data. Thus, even if the second flash memory 9b is dismounted, the IC recorder 1 is able to record/reproduce the task files without being affected by such dismounting of the second flash memory 9b.

Although the task files composed of speech data are taken as an example in the foregoing description, this is merely illustrative such that data other than such task file can be used within the scope of the present invention.

INDUSTRIAL APPLICABILITY

With the recording/reproducing apparatus of the present invention, respective management data are read out from respective storage means to generate new management data, and the respective storage means are handled as one based on new management data to perform control on data writing and readout, so that the data can be handled easily without the user having to be conscious in which storage means is stored the data.

Also, with the recording/reproducing system according to the present invention, an external control device controls the control means of the recording/reproducing apparatus to read out respective management data from plural storage means via an interface and to read out management data from other storage means. Based on the read-out management data, the respective storage means are handled as unitary storage means to control data writing and data readout. Thus, the data can be handled easily without the operator having to be conscious as to in which storage means the data are stored.

The invention claimed is:

1. A device, comprising:
   a first storage unit configured to store first data and first management data corresponding to the first data; and
   a controller configured to read out second management data from an external storage device connected to the device, said second management data corresponding to second data stored on said external storage device, wherein the controller is configured to read out all table of contents data from the external storage device and display all of the read out table of contents data, when the device detects the connection with the external storage device,
   wherein said external storage device includes an actuating device and is configured to reproduce said second data according to an operation of said actuating device; and
   wherein when the device is connected to said external storage device, the external storage device hands over operational control to the device, and said controller controls operations of said external storage device by sending input signals from an actuating portion of the device to a controller of the external storage device.

2. The device of claim 1, wherein said controller is configured to generate new management data based on said first management data and said second management data.

3. The device of claim 2, wherein the external storage device includes a reproducing unit configured to reproduce said second data stored on said external storage device based on said new management data.

4. The device of claim 2, wherein said controller is configured to generate said new management data including at least one of identifying information, priority information, and recording time of said first data and said second data, and to display said new management data on said display unit.

5. The device of claim 1, wherein said first storage unit is configured to store audio data as said first data, and wherein said external storage device is configured to store audio data as said second data.

6. The device of claim 1, further comprising:
   a display unit configured to display at least one of the first management data and the second management data.

7. A method of managing data, comprising:
   storing, on a first device, first data and first management data corresponding to the first data; and
   reading out second management data from a second device connected to the first device, said second management data corresponding to second data stored on said second device, wherein the reading step comprises reading out all table of contents data from the second device and displaying all of the read out table of contents data, when the first device detects the connection with said second device,
   wherein said second device includes an actuating device and is configured to reproduce said second data according to an operation of said actuating device; and
   wherein when the first device is connected to said second device, the second device hands over operational control to the first device, and the first device controls operations of said second device by sending input signals from an actuating portion of the first device to a controller of the second device.

8. The method of claim 7, further comprising:
   generating new management data based on said first management data and said second management data.

9. The method of claim 8, further comprising:
   reproducing said second data stored on said second device based on the generated new management data.

10. The method of claim 8, wherein said generating step comprises:
    generating said new management data including at least one of identifying information, priority information, and recording time of said first data and said second data, and said displaying step includes displaying said new management data on said display unit.

11. The method of claim 7, wherein said storing step comprises:
    storing audio data as said first data, wherein said second device is configured to store audio data as said second data.

12. The method of claim 7, further comprising:
    displaying at least one of the first management data and the second management data on a display unit.

13. A system for managing data, comprising:
    a first device configured to store first data and first management data corresponding to the first data wherein said first device includes an actuating device and is configured to reproduce said first data according to an operation of said actuating device; and
    a second device including
      a storage unit configured to store second data and second management data corresponding to the second data; and
      a controller configured to read out the first management data from the first device when the first device is connected to the second device, wherein when the second device is connected to the first device, the first device hands over operational control to the second device, and said controller controls operations of said first device by sending input signals from an actuating portion of the second device to a controller of the first device, wherein the controller is configured to read out all table of contents data from the first device and display all of the read out table of contents data, when the second device detects the connection with the first device.

14. A device, comprising:
means for storing first data and first management data corresponding to the first data;
means for reading out second management data from an external storage device connected to the device, said second management data corresponding to second data stored on said external storage device, wherein said external storage device includes an actuating device and is configured to reproduce said second data according to an operation of said actuating device, wherein the means for reading is configured to read out all table of contents data from the external storage device and display all of the read out table of contents data, when the device detects the connection with the external storage device; and
means for controlling operations of said external storage device when the device detects a connection with said external storage device by sending input signals from an actuating portion of the device to a controller of the external storage device, wherein the external storage device hands over operational control to the device when connected to the device.

15. A computer-readable storage medium having embedded therein a computer program product, the computer program product comprising:
instructions for storing, on a device, first data and first management data corresponding to the first data;
instructions for reading out second management data from a external storage device connected to the device, said second management data corresponding to second data stored on said external storage device, wherein said external storage device includes an actuating device and is configured to reproduce said second data according to an operation of said actuating device, wherein the instructions for reading include instructions for reading out all table of contents data from the external storage device and display all of the read out table of contents data, when the device detects the connection with the external storage device; and
instructions for controlling operations of said external storage device when the device detects a connection with said external storage device by sending input signals from an actuating portion of the device to a controller of the external storage device, wherein the external storage device hands over operational control to the device when connected to the device.

16. A device, comprising:
a first storage unit configured to store first data and first management data corresponding to the first data;
a first controller configured to read out the first data from said first storage; and
a connector configured to attach the device to an external device, the external device including a second controller configured to read out the first management data from the device and to read out second management data from the external device, said second management data corresponding to second data stored on said external device, wherein said device includes an actuating device and is configured to reproduce said first data according to an operation of said actuating device; and
wherein when the external device is connected to said device, the device hands over operational control to the external device, and said second controller is configured to control operations of said device by sending input signals from an actuating portion of the external device to the first controller, wherein the second controller is configured to read out all table of contents data from the device and display all of the read out table of contents data, when the external device detects the connection with the device.

17. A system for managing audio data, comprising:
a audio player; and
a device,
wherein said audio player includes
a storage unit configured to store audio data and audio management data corresponding to said audio data;
a reproducing unit configured to reproduce said audio data;
an actuating unit configured to actuate a command;
a reproducing controller configured to read said audio data and send said audio data to said reproducing unit based on said command; and
a connector configured to attach said audio player to said device; and
wherein said device includes
a second storage unit configured to store second data and second management data corresponding to the second data; and
a controller configured to, when the device is connected to said audio device, read out the audio management data from said audio player and to control operations of said audio device by sending input signals from an actuating portion of the device to a controller of the audio player, wherein the audio device hands over operational control to the device when connected to the device, wherein the controller is configured to read out all table of contents data from the audio player and display all of the read out table of contents data, when the device detects the connection with the audio player.

18. An audio player, comprising:
a storage unit configured to store audio data and management data corresponding to said audio data;
a reproducing unit configured to reproduce said audio data;
an actuating unit configured to actuate a command;
a reproducing controller configured to read said audio data and to send said audio data to said reproducing unit based on said command; and
a connector configured to attach said audio player to an external device, said external device including a controller configured to read out said management data from said audio player,
wherein the audio player hands over operational control to the external device and is controlled by said controller of said external device when the external device is connected to said audio player, by sending input signals from an actuating portion of the external device to a controller of the audio player, wherein the controller is configured to read out all table of contents data from the audio player and display all of the read out table of contents data, when the external device detects the connection with the audio player.

* * * * *